United States Patent
Fujimoto (10) Patent No.: US 8,341,199 B2
(45) Date of Patent: *Dec. 25, 2012

(54) STORAGE SYSTEM, A METHOD OF FILE DATA BACK UP AND A METHOD OF COPYING OF FILE DATA

(75) Inventor: Kazuhisa Fujimoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 284 days.

This patent is subject to a terminal disclaimer.

(21) Appl. No.: 11/878,476

(22) Filed: Jul. 25, 2007

(65) Prior Publication Data

US 2008/0209144 A1   Aug. 28, 2008

Related U.S. Application Data

(63) Continuation of application No. 10/020,313, filed on Dec. 18, 2001, now Pat. No. 7,275,050.

(30) Foreign Application Priority Data

May 25, 2001   (JP) ................................. 2001-156724

(51) Int. Cl.
G06F 12/00 (2006.01)
G06F 17/30 (2006.01)
(52) U.S. Cl. ................... 707/827; 707/822; 707/823
(58) Field of Classification Search ............... 707/827, 707/831, 828, 829, 830
See application file for complete search history.

(56) References Cited

U.S. PATENT DOCUMENTS

| | | | |
|---|---|---|---|
| 4,825,435 A | 4/1989 | Amundsen et al. | |
| 5,235,689 A | 8/1993 | Baker et al. | |
| 5,371,837 A | 12/1994 | Kimber et al. | |
| 5,634,111 A | 5/1997 | Oeda et al. | |

(Continued)

FOREIGN PATENT DOCUMENTS

EP   0924596 A2   6/1999

(Continued)

OTHER PUBLICATIONS

C.C. Huang, "Dynamic Validation of a Large Virtual Partition Space", IBM Technical Disclosure Bulletin, vol. 16, No. 7 (Dec. 1973), pp. 2104-2105.

(Continued)

Primary Examiner — Robert Beausoliel, Jr.
Assistant Examiner — Hexing Liu
(74) Attorney, Agent, or Firm — Mattingly & Malur, PC (57) ABSTRACT

A storage system manages the total capacity of a shared storage medium to store block-basis data and file-basis data. When block data and its address are input through a fiber channel port, an input/output unit converts its data format to a data format that is internally applied by the storage system. When file data and its address are input, a file system converts its data format to a block data format internally applied by the storage system. The file system derives a file logical volume address from the received file address and translates file data to block data. A managing unit derives the address of a block logical volume from the block address delivered from the input/output unit. The managing unit translates block logical volume address or the file logical volume address to a physical address, and writes data to or reads data from the shared storage medium.

21 Claims, 10 Drawing Sheets

U.S. PATENT DOCUMENTS

| | | | |
|---|---|---|---|
| 5,638,497 | A | 6/1997 | Kimber et al. |
| 5,809,279 | A | 9/1998 | Oeda et al. |
| 5,812,864 | A | 9/1998 | McCoy et al. |
| 5,903,716 | A | 5/1999 | Kimber et al. |
| 5,991,542 | A | 11/1999 | Han et al. |
| 6,002,669 | A | 12/1999 | White |
| 6,029,168 | A | 2/2000 | Frey |
| 6,105,092 | A | 8/2000 | Oeda et al. |
| 6,260,120 | B1 | 7/2001 | Blumenau et al. |
| 6,269,431 | B1 * | 7/2001 | Dunham .................. 711/162 |
| 6,314,501 | B1 | 11/2001 | Gulick et al. |
| 6,320,520 | B1 | 11/2001 | Luby |
| 6,366,987 | B1 * | 4/2002 | Tzelnic et al. ............ 711/162 |
| 6,421,711 | B1 | 7/2002 | Blumenau et al. |
| 6,499,075 | B2 | 12/2002 | Oeda et al. |
| 6,567,863 | B1 | 5/2003 | Lafuite et al. |
| 6,606,630 | B1 | 8/2003 | Gunlock |
| 6,622,220 | B2 | 9/2003 | Yoshida et al. |
| 6,636,982 | B1 | 10/2003 | Rowlands |
| 6,675,200 | B1 | 1/2004 | Cheriton et al. |
| 6,691,209 | B1 | 2/2004 | O'Connell |
| 6,748,448 | B1 | 6/2004 | Barrera et al. |
| 6,760,840 | B1 | 7/2004 | Shimbo et al. |
| 6,792,429 | B2 * | 9/2004 | Gilbert .................. 1/1 |
| 6,807,581 | B1 | 10/2004 | Starr et al. |
| 6,868,417 | B2 | 3/2005 | Kazar et al. |
| 6,880,102 | B1 | 4/2005 | Bridge |
| 7,027,439 | B1 * | 4/2006 | Barrow et al. .............. 370/389 |
| 7,275,050 | B2 * | 9/2007 | Fujimoto ................ 711/100 |
| 2001/0001870 | A1 | 5/2001 | Ofek et al. |
| 2002/0007445 | A1 | 1/2002 | Blumenau et al. |
| 2002/0049825 | A1 | 4/2002 | Jewett et al. |
| 2002/0059263 | A1 | 5/2002 | Shima et al. |
| 2002/0069245 | A1 | 6/2002 | Kim |
| 2002/0083120 | A1 * | 6/2002 | Soltis .................. 709/200 |
| 2002/0112022 | A1 | 8/2002 | Kazar et al. |
| 2002/0138693 | A1 | 9/2002 | Aasland |
| 2002/0152339 | A1 * | 10/2002 | Yamamoto ................ 710/36 |
| 2002/0178143 | A1 * | 11/2002 | Fujimoto ................ 707/1 |
| 2003/0097504 | A1 | 5/2003 | Oeda et al. |
| 2003/0135578 | A1 | 7/2003 | Banga et al. |
| 2003/0140209 | A1 * | 7/2003 | Testardi .................. 711/203 |
| 2003/0236945 | A1 | 12/2003 | Nahum |
| 2007/0203950 | A1 | 8/2007 | Inohara et al. |

FOREIGN PATENT DOCUMENTS

| | | |
|---|---|---|
| EP | 1100001 A2 | 5/2001 |
| JP | 5-307440 | 1/1993 |
| JP | 2000-122814 A | 4/2000 |
| JP | 2000-276306 A | 10/2000 |

OTHER PUBLICATIONS

A. J. Sutton et al., "Processors Sharing and Partitioning of Main Storage in the MP System", IBM Technical Disclosure Bulletin, vol. 22, No. 5 (Oct. 1979), pp. 2009-2010.

M. Bouillot, "Computer Provided with Storage Expansion and Adapted for Processing Paged Programs", IBM Technical Disclosure Bulletin, vol. 16, No. 10 (Mar. 1974), pp. 3270-3271.

"Address Validity Checking During a Program Execution Test. January 1974", IBM Technical Disclosure Bulletin, (Oct. 1974), pp. 2557-2558.

L. W. Avery, "Programmable Address Configuration of Memory", IBM Technical Disclosure Bulletin, vol. 24, No. 2 (Jul. 1981), pp. 968-970.

"Dynamic Reformatting and Merging of Data Streams", IBM Technical Disclosure Bulletin, vol. 32, No. 9B (Feb. 1990), pp. 113-119.

John Ioannidis et al., "IP-Based Protocols for Mobile Internetworking", Department of Computer Science, Columbia University, pp. 235-245.

Ross W. Callon, "Use of OSI IS-IS for Routing in TCP/IP and Dual Environments", Network Working Group (Dec. 1990), pp. i-iii, 1-65.

USENIX Association, "Proceeding of the Winter 1991 USENIX Conference", Jan. 21-25, 1991, pp. 199-204.

Tomita, Aki et al, "A Scalable, Cost-Effective, and Flexible Disk System Using High-Performance Embedded-Processors", IEEE, Aug. 21, 2000, pp. 317-326.

* cited by examiner

STORAGE SYSTEM, A METHOD OF FILE DATA BACK UP AND A METHOD OF COPYING OF FILE DATA

CROSS-REFERENCES

This is a continuation application of U.S. Ser. No. 10/020,313, filed Dec. 18, 2001 now U.S. Pat. No. 7,275,050.

BACKGROUND OF THE INVENTION

1. Field of the Invention

The present invention relates to a storage system for storing data on hard disk drives. More specifically, the present invention relates to a storage system for inputting/outputting block-basis data as well as file-basis data.

2. Description of Related Art

In the current information-oriented society, with the prevalence of inter-corporate electronic commerce by using the Internet and inter-corporate links, typically, supply chain management, making good use of data is important in corporate strategy.

Storage systems for storing information facilitate IT platforms connection and operation.

With the explosive increase of data amount, the cost required for maintaining and managing storage systems increases significantly.

Corporations tend to gather storage systems and servers connected thereto in a data center, apply centralized management of databases such that kinds of servers can access to the databases and share data so as to reduce Total Cost of Ownership (TCO) by simplifying the operation, maintenance and management of the overall system.

As a method for allowing different kinds of servers to access storage systems and share the data stored in these systems, a Storage Area Network (hereinafter abbreviated to SAN) is developed. The SAN is the network dedicated to storage using fiber channels, each of which provides an interface connecting a server and a storage system, and a switch for fiber channels. The SAN thus makes multipoint-to-multipoint connections between a plurality of servers and a plurality of storage systems.

Applications to run on servers handle file-basis data, whereas storage systems connected to the SAN, typically a disk array, operate for block-basis data input and output.

Thus, when data input/output between a server and a storage system is performed, a file system on the server translates file-basis data to block-basis data that is input via the SAN to the storage and translates block data output via the SAN from the storage to file data.

Meanwhile, Network Attached Storage (hereinafter abbreviated to NAS) has become prevalent as another method for allowing different kinds of servers to access storage systems and share the data stored in these systems.

The NAS has a file system within the storage system, and file-basis data input/output is performed between a server and the NAS. The file system within the NAS translates file-basis data to block-basis data that is stored on a hard disk drive.

Thus, the NAS is connected to a Local Area Network ("LAN") that is popular as a general network for server-to-server communication.

As described above, the SAN and NAS become prevalent as the means for sharing data. Such an environment as is schematized in FIG. 2 where a storage system, typically, a disk array system 6, connected to a fiber channel based Storage Area Network (FC-SAN) 2 coexists with a NAS 7 connected to a LAN 3 in a data center.

While the SAN is the fiber channel based network for carrying block-basis data as described above, standardizing the procedure for block-basis data input/output between the storage system and host servers is by the Internet Protocol (hereinafter abbreviated as "IP") that is generally used for the communication between the host servers 1 via the LAN 3. In future, an Ethernet based SAN 9 (FIG. 3) is expected to become popular.

Figure 3:
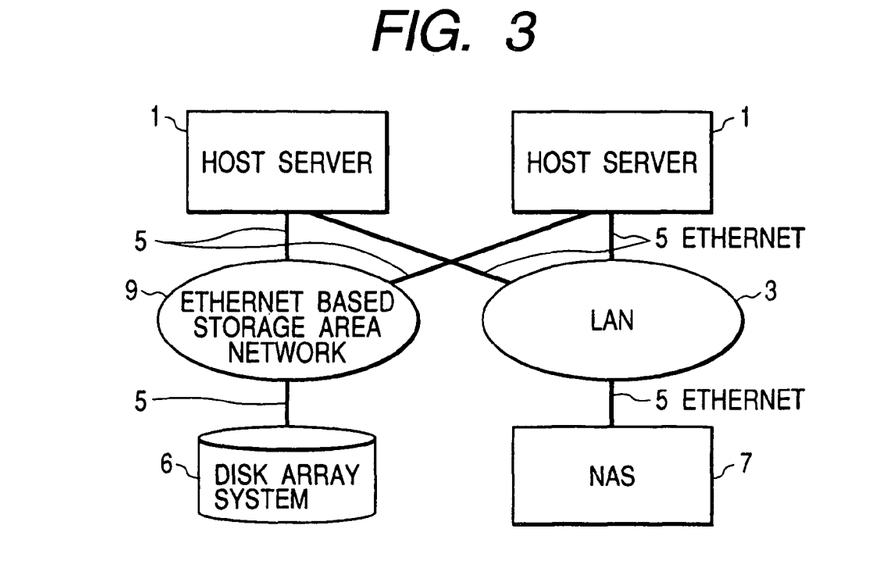
FIG. 3 is a diagram of another environment where a disk array system and a NAS coexists.

In future, such an environment is expected to be what is in the topology schematized in FIG. 3 where a disk array system 6 and a NAS 7 coexist.

Since the NAS connected to the LAN 3 may transmit and receive a great deal of data to/from the host server 1, the increased load on the LAN 3 affects the communication between the host servers 1.

If the Ethernet based SAN 9 becomes prevalent, it is conceivable that the NAS 7 be connected to the Ethernet based SAN 9 in the topology shown in FIG. 3.

Figure 2:
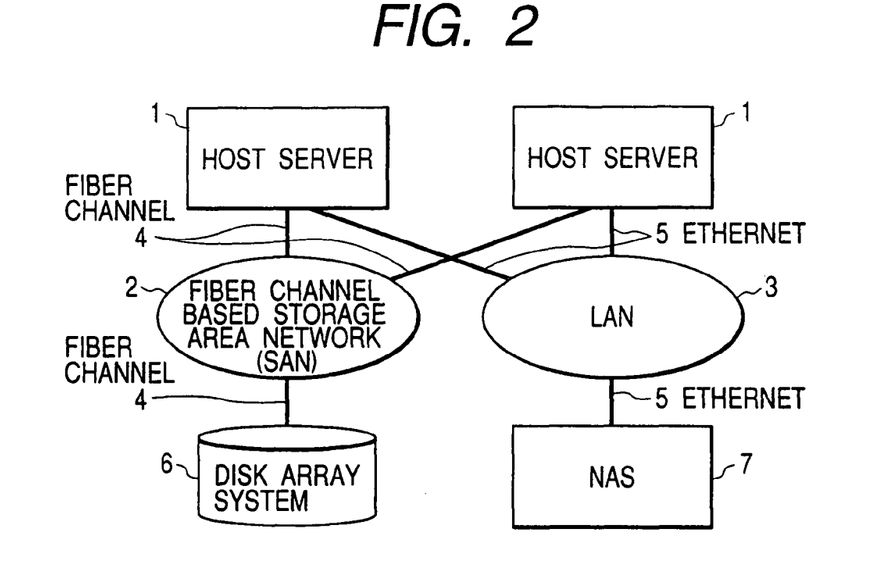
FIG. 2 is a diagram representing an environment where a disk array system and a NAS coexists.

As shown in FIGS. 2 and 3, the environment where the disk array system 6 and the NAS 7 coexist in a data center is expected to become popular in future, though the topology may be in various forms. In such environment where different types of systems exist separately, system maintenance and management will become complex.

Because both the disk array system 6 and NAS 7 store block-basis data on hard disk drives, it is theoretically possible for them to share the drives to store data. However, it is difficult to share the drives because they were conventionally separate systems.

The NAS transmits and receives data to/from other storage systems with the intervention of a file system. Consequently, the NAS is slow data backup and copy speed in comparison with storage systems such as disk array systems that directly transmit and receive block-basis data between them without the intervention of the file systems.

SUMMARY OF THE INVENTION

An object of the present invention is to provide a storage system wherein the total capacity of hard disk drives can be used effectively and the management thereof is easy to reduce the TCO of the storage system.

More specifically, another object of the present invention is to allow the total capacity of hard disk drives to be used effectively and the management thereof is simplified in environment where a storage system for storing block-basis data, typically, a disk array system, coexists with a storage system for storing file-basis data, typically, a NAS. Yet another object of the present invention is to provide storage systems between which backing up and copying of file-basis data is performed at high speed.

To achieve the above objects, the present invention, in one aspect, provides a storage system provided with a plurality of hard disk drives for storing data and a means for managing storage areas on the plurality of hard disk drives, comprising block data input/output ports, file data input/output ports, block data input/output means, file data input/output means, and a file system for transforming file data to block data and block data to file data. The data input/output through one of the block data input/output ports is written to or read from any area of the storage areas through the processing of the block data input/output means and the means for managing the storage areas. The data input/output through one of the file data input/output ports is written to or read from any area of the storage areas through the processing of the file data input/output means, the file system, and the means for managing the storage areas.

The total space of the storage areas of the storage system consists of first storage areas for storing data input/output as block data and second storage areas for storing data input/output as file data.

The storage system further includes a means for partitioning the total space of the storage areas of the storage system into the first and second storage areas.

The means for partitioning includes a means for reallocating some of the first storage areas to be used as the second storage areas and a means for reallocating some of the second storage areas to be used as the first storage areas.

Alternatively, the total space of the storage areas of the storage system may includes first storage areas for storing data input/output as block data, second storage areas for storing data input/output as file data, and third storage areas that do not classified as either of the first and second storage areas.

In this case, the storage system further includes a means for partitioning the total space of the storage areas of the storage system into the first, second, and third storage areas.

The means for partitioning includes a means for reallocating some of the third storage areas to be used as the first or second storage areas if necessary.

The maximum number of the ports that the storage system has is fixed, but the number of the block data input/output ports and the number of the file data input/output ports are variable and can be adjusted, provided the maximum number of the ports is not exceeded.

In another aspect, the present invention provides a storage system with a plurality of hard disk drives for storing data and a means for managing storage areas on the plurality of hard disk drives, comprising a plurality of input/output ports for Internet Protocol compliant packets, a block data and file data input/output means, and a file system for transforming file data to block data and block data to file data. The plurality of ports are grouped into a first port group for block data input/output and a second port group for file data input/output. The data input/output through a port of the first port group is written to or read from any area of the storage areas through the processing of the block data and file data input/output means and the means for managing the storage areas. The data input/output through a port of the second port group is written to or read from any area of the storage areas through the processing of the block data and file data input/output means, the file system, and the means for managing the storage areas.

In yet another aspect, the present invention provides a storage system with a plurality of hard disk drives for storing data and a means for managing storage areas on the plurality of hard disk drives, comprising a plurality of input/output ports for Internet Protocol compliant packets, a block data and file data input/output means, and a file system for transforming file data to block data and block data to file data The block data and file data input/output means further determines whether the block data or the file data has just been input or is being output so as to decide whether to pass the data for further processing. The block data is written to or read from any area of the storage areas through the processing of the block data, the file data input/output means, and the means for managing the storage areas. File data is written to or read from any area of the storage areas through the processing of the block data, the file data input/output means, the file system, and the means for managing the storage areas.

Other and further objects, features and advantages of the invention will appear more fully from the following description.

BRIEF DESCRIPTION OF THE DRAWINGS

The preferred embodiments of the present invention are illustrated in the accompanying drawings, in which.

DETAILED DESCRIPTION OF THE PREFERRED EMBODIMENTS

With reference to the attached drawings, preferred embodiments of the present invention are described below.

<Embodiment 1>

Figure 1:
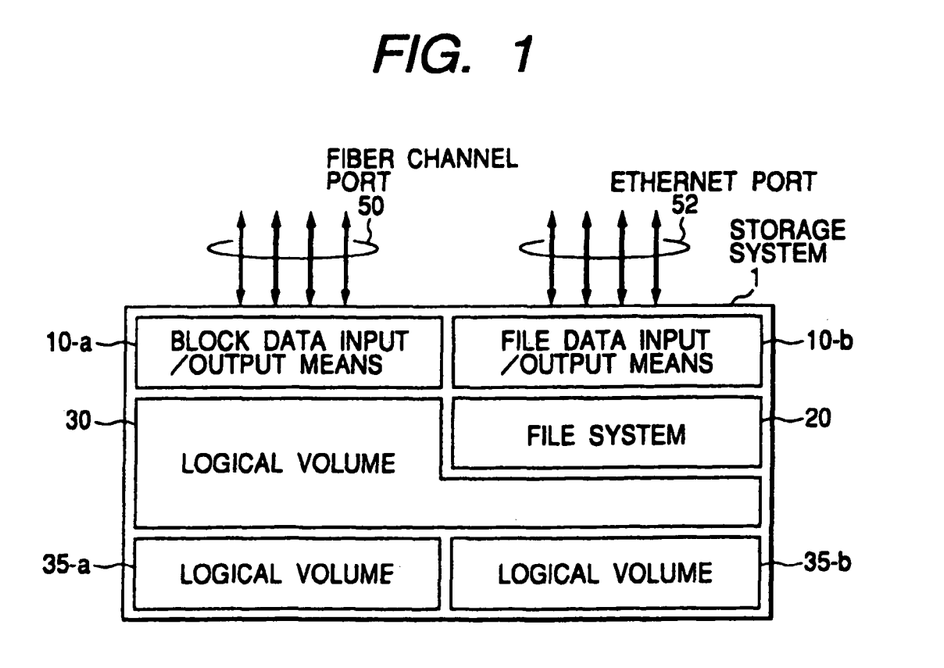
FIG. 1 is a diagram showing a storage system of one embodiment of the present invention constructed in a logical structure.
Figure 4:
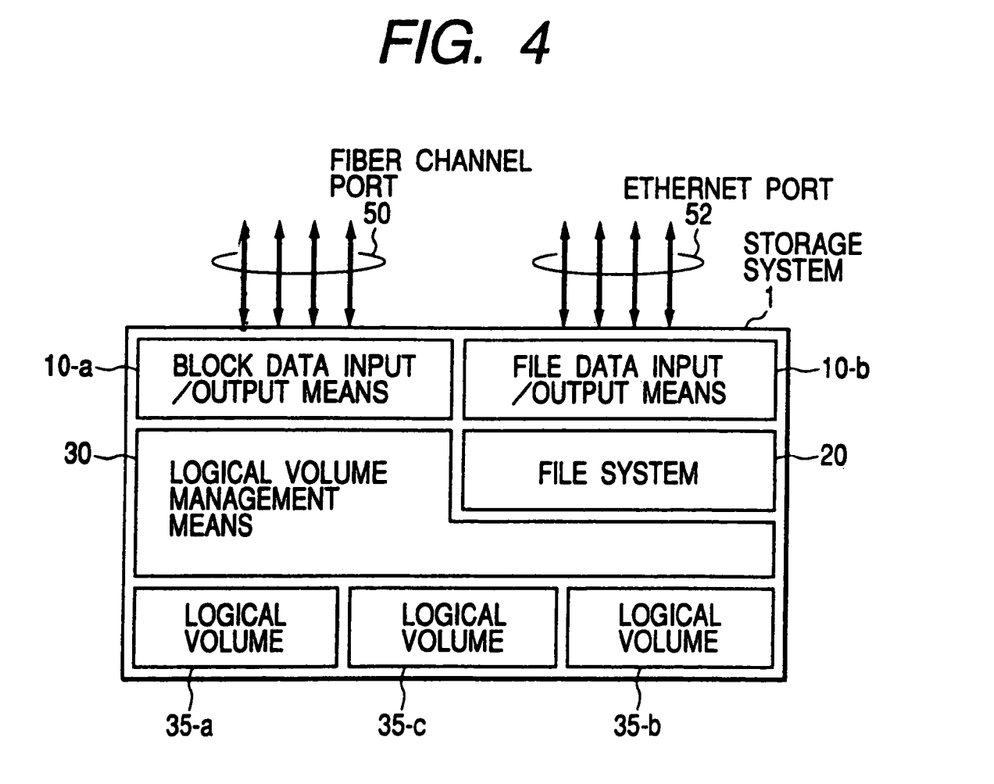
FIG. 4 is a diagram of a storage system of the present invention constructed in another logical structure.
Figure 7:
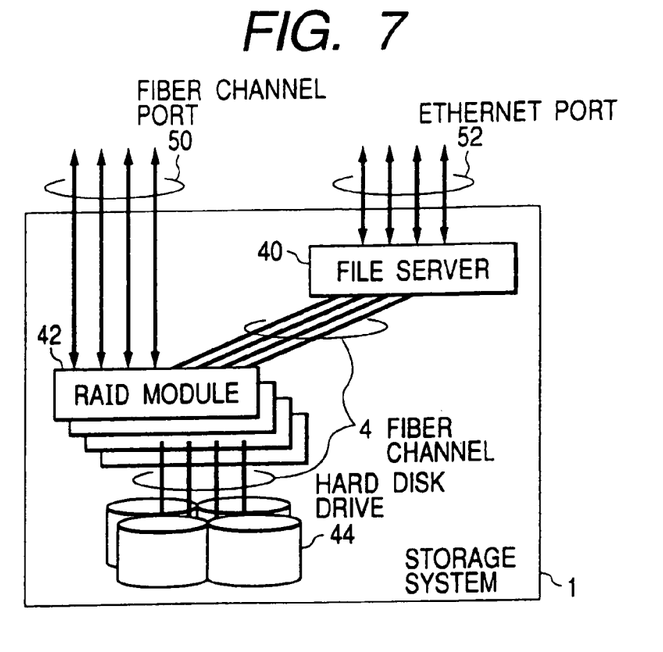
FIG. 7 is a diagram showing an actual configuration of the storage system shown in FIG. 1.

A preferred Embodiment 1 of the present invention is depicted in FIGS. 1, 4, and 7.

A storage system of Embodiment 1 operates under the assumption that its storage areas are managed in units of logical volumes. Other embodiments are also subject to this assumption.

FIG. 1 shows the storage system 1 constructed in a logical structure.

The storage system 1 includes four fiber channel ports 50, four Ethernet channel ports 52, a block data input/output means 10-*a*, a file data input/output means 10-*b*, a logical volume management means 30, a file system 20, and logical volumes 35-*a* and 35-*b*.

Under the control of the logical volume management means 30, the logical volumes 35-*a* and 35-*b* taking the physical addresses of a plurality of hard disk drives and the logical volume management means 30 manages the storage areas on the plurality of hard disk drives. The logical volume management means 30 internally maintains a table that maps the addresses of the logical volumes to the physical addresses on the hard disk drives ("an address translation table", hereinafter) (which is not shown).

The logical volumes are divided into two groups: logical volumes 35-*a* for storing block-basis data (hereinafter referred to as block data) and logical volumes 35-*b* for storing file-basis data (hereinafter "file data").

Instead of the fiber channel ports 50, other types of ports that enable input/output of block data, for example, SCSI ports may be used.

Similarly, instead of the Ethernet ports, other types of ports that enable input/output of file data may be used.

FIG. 7 shows one example of the basic, actual configuration of the storage system in FIG. 1.

The storage system 1 includes four RAID modules 42, each having one fiber channel port 50, one file server 40 with four Ethernet ports 52, and a plurality of hard disk drives 44.

The file server 40 and the four RAID modules 42 are connected with four fiber channels 4.

The number of the components specified above should be considered only illustrative rather than restrictive.

The correspondence between the logical structure shown in FIG. 7 and the actual configuration shown in FIG. 1 is as follows. The block data input/output means (10-a) and the logical volume management means (30) shown in FIG. 1 substantially correspond to the RAID modules (42) shown in FIG. 7. The file data input/output means (10-b) and file system (20) shown in FIG. 1 substantially correspond to the file server (40) shown in FIG. 7. The output of the file server (40) is connected to the RAID modules (42) with the fiber channels. The logical volumes (35-a and 35-b) correspond to the hard disk drives (44).

As an example, because of the physical size limitation of the storage system, the maximum number of ports that the storage system 1 has is fixed to eight. However, the number of the fiber channel ports 50 can be increased by increasing the number of the RAID modules 42.

If the number of the fiber channel ports is increased, the number of the Ethernet ports 52 connected to the file server must be decreased accordingly so as to maintain the same total port number.

The number of the fiber channel ports 50 can also be increased by increasing the number of the fiber channel ports 50 connected to one RAID module 42.

Conversely, if the number of the Ethernet ports 52 connected to the file server 40 is increased, the number of fiber channel ports 50 connected to the RAID modules 42 must be decreased accordingly so as to maintain the same port number.

In this way, the number of the fiber channel ports 50 and the number of the Ethernet ports 52 are set, by a user.

Figure 11:
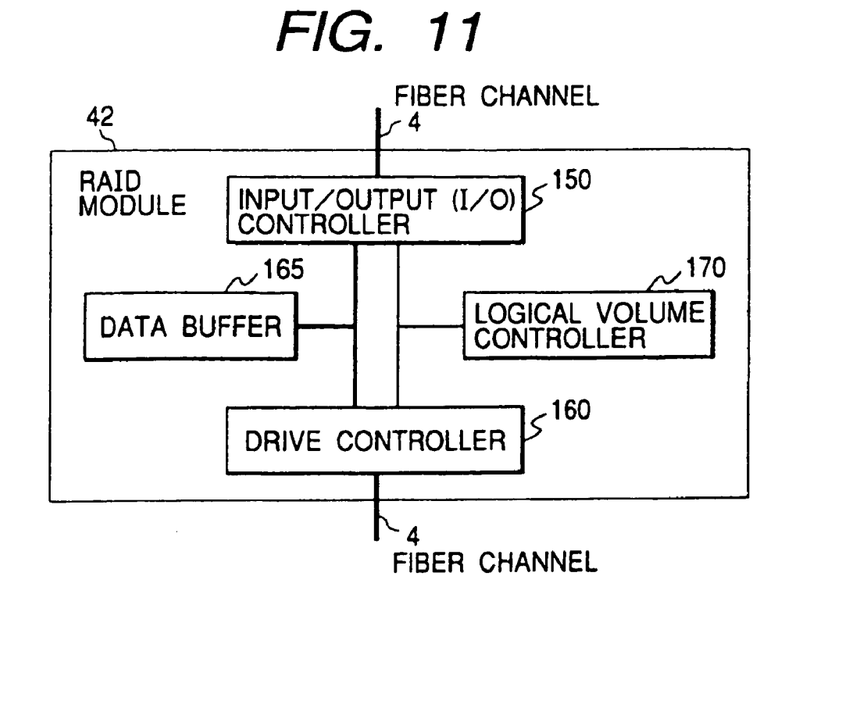
FIG. 11 is a diagram of a RAID module shown in FIG. 7.
Figure 12:
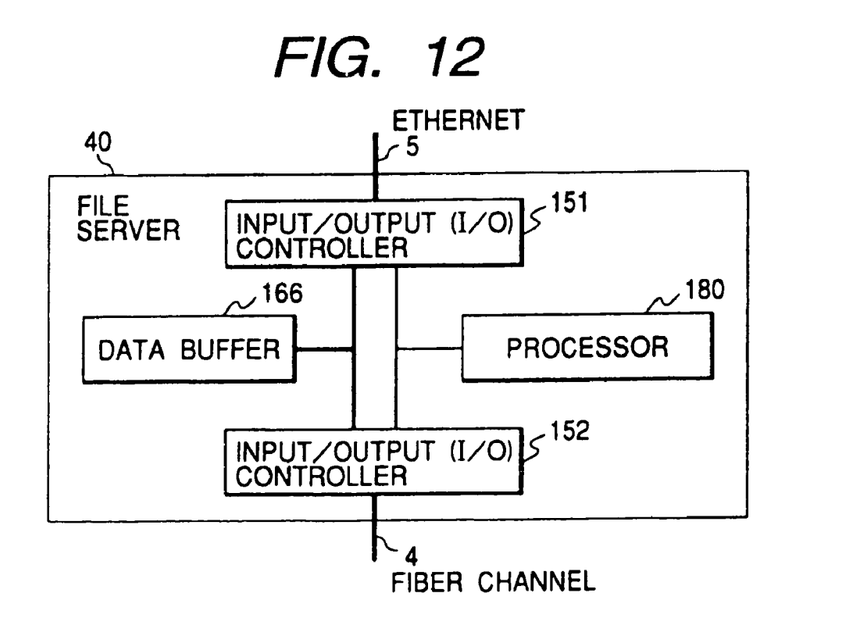
FIG. 12 is a diagram of a file server shown in FIG. 7.

As is shown in FIG. 11, each RAID module 42 includes an input/output (I/O) controller 150 which connects to a fiber channel port 50 with a fiber channel 4 and has the terminal of a fiber channel from the file server which is shown in FIG. 12, a drive controller 160 which connects to the hard disk drives with a fiber channel 4, a logical volume controller 170, and a data buffer 165.

The input/output (I/O) controller 150 performs block data input/output processing.

The drive controller 160 writes/reads block data to/from the hard disk drives.

The data buffer 165 buffers data between the input/output (I/O) controller 150 and the drive controller 160.

The logical volume controller 170 maintains a logical volume inventory table and locates a logical volume including any requested block data by referring to this table. The logical volume controller 17 also translates the logical address of block data into a physical address.

As is shown in FIG. 12, the file server 40 includes an input/output (I/O) controller 151 which connects to the Ethernet ports 52 with an Ethernet 5, another input/output (I/O) controller 152 which connects the RAID modules 42 with fiber channels 4, a processor 180, and a data buffer 166.

The input/output (I/O) controller 151 performs file data input/output processing.

The input/output (I/O) controller 152 writes/reads block data to/from the RAID modules 42.

The data buffer 166 buffers data between the input/output (I/O) controller 151 and the input/output (I/O) controller 152.

The processor 180 operates under the control of NFS (Network File System) operating as the file system under UNIX (a registered trademark of the UNIX System laboratories), i.e. operating as an operating system.

This file system translates file data transferred from a host server that accessed the file server into a block data format.

The above OS and file system are not limited to the UNIX and the NFS, respectively. Other OSs and file systems may be used, provided that they receive file I/O request (input/output request for file-basis data) from the host server, convert it to block I/O request (input/output request for block-basis data), and gain access to the RAID modules 42.

The logical volumes 35-a for block data and the logical volumes 35-b for file data are allocated by recording their locations in the logical volume inventory table that retains the logical volume locations defined in the storage system 1 by a service processor (hereinafter "SVP"). The SVP allows the user to set or manage any available logical volumes in the storage system 1.

For example, a notebook-size personal computer connected to the storage system via a LAN can be used as the SVP.

The SVP obtains access to the logical volume controller 170 shown in FIG. 11.

When the storage system 1 is initialized, all logical volumes are allocated by setting a required number of logical volumes for block data such that the remaining logical volumes will be assigned for file data.

After the storage system 1 is put into service, if, for example, the logical volumes 35-a for block data become while there are free space in logical volumes 35-b for file data, the volume allocations defined in the logical volume inventory table can be altered automatically or manually from the SVP such that some logical volumes 35-b for file data that are available are reassigned for block data as many as required.

Conversely, if the logical volumes for file data become full, the logical volume allocations, of course, can be altered accordingly by altering the allocations defined in the logical volume inventory table.

How the functional components of the storage system write and read block data and file data is explained below.

When block data is to be written, the block data is input to the storage system through a fiber channel port 50.

Then, the block data input/output means 10-a processes the block data according to the protocol required by the fiber channels and converts its data format into a data format that is internally applied in the storage system 1.

The logical volume management means 30 derives the address of a logical volume 35-a to write the block data from the address transmitted with the data.

Then, the block data is written to the physical address on the drive specified by the address translation table within the logical volume management means 30.

When block data is to be read, the logical volume management means 30 derives the address of a logical volume 35-a to read the block data from the address of the block data specified in the read request transmitted from the host computer.

Then, the data is read from the physical address on the drive specified by the address translation table within the logical volume management means 30. The block data input/output means 10-a converts its data format that is internally applied in the storage system 1 to the data format for fiber channels. After performing the processing for reading block data according to the protocol required by the fiber channels, the block data input/output means 10-a outputs the block data through a fiber channel port 50.

When file data is to be written, the file data is input to the storage system through an Ethernet port 52.

Then, the file data input/output means 10-*b* the file data according to the required Internet Protocol, and converts its data format to the data format for the file system 20.

The file system 20 derives the address of a logical volume 35-*b* to store the data, from the file data and transforms the file data into block data.

Then, the data is written to the physical address on the drive specified by the address translation table within the logical volume management means 30.

When file data is to be read, the file system 20 derives the address of a logical volume 35-*b* from the file data specified in the read request transmitted from the host computer.

Then, the block data corresponding to the file data is read from the physical address on the drive specified by the address translation table within the logical volume management means 30. The file system 20 transforms the block data into file data by the file data input/output means 10-*b* so as to convert its data format for the file system 20 to the data format for Internet Protocol and outputs the file data through an Ethernet port 52.

According to Embodiment 1, both functions of the disk array system 6 and the NAS 7, shown in FIG. 2, are made coexisting in a single storage system wherein the hard disk drives are shared to store block data and file data. Thus, the total capacity of the hard disk drives is used effectively. Accordingly, the system management is simplified. Consequently, the TCO of the storage system is reduced.

In Embodiment 1, the preferred embodiment, logical volume allocation is performed in such a manner as represented in FIG. 4.

In this manner, the logical volumes are divided into three types: logical volumes 35-*a* for storing block data, logical volumes 35-*b* for storing file data 35-*b*, and logical volumes 35-*c* not assigned as either type.

Allocating the logical volumes is carried out in the same way as described with FIG. 1, i.e., in the logical volume inventory table within the logical volume management means 30, and volume allocations are set or changed by the SVP.

When the storage system 1 operates, if, for example, the logical volumes 35-*a* for block data become full, the volume allocations defined in the logical volume inventory table is altered by the SVP such that some logical volumes 35-*c* are allocated for block data as many as required.

Similar reallocation is possible if the logical volumes for file data 35-*b* become full.

The volume allocations defined in the logical volume inventory table are altered by the SVP such that some logical volumes 35-*a* or 35-*b* that become available are reallocated as logical volumes 35-*c*.

According to the allocation manner represented in FIG. 4, new logical volumes can be added if both the logical volumes 35-*a* for block data and the logical volumes 35-*b* for file data become full of data.

<Embodiment 2>

Figure 5:
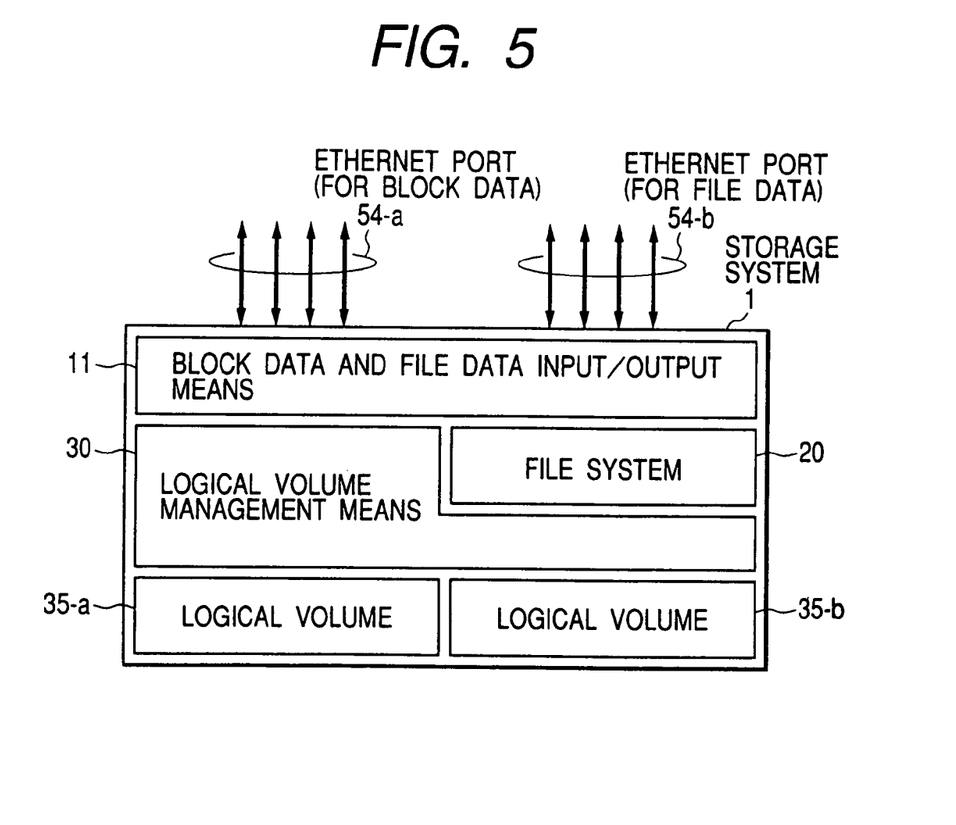
FIG. 5 is a diagram of a storage system of the present invention constructed in yet another logical structure.
Figure 8:
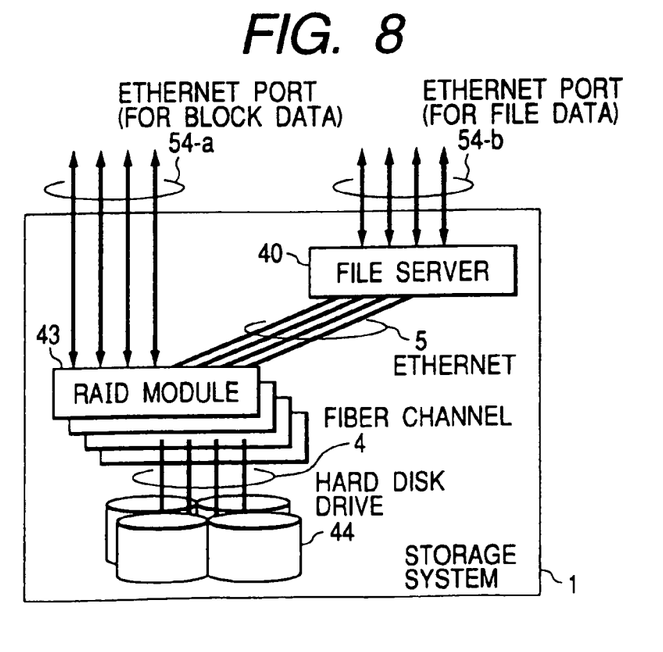
FIG. 8 is a diagram showing an actual configuration of the storage system shown in FIG. 5.

A preferred Embodiment 2 of the present invention is depicted in FIGS. 5 and 8.

A storage system of Embodiment 2 also operates under the assumption that its storage areas are managed in units of logical volumes. Other embodiments are also subject to this assumption.

FIG. 5 shows the storage system 1 constructed according to another logical structure.

The logical structure of the storage system 1 shown in FIG. 5 is the same as the one of Embodiment 1 shown in FIG. 1 except that the block data input/output means 10-*a* and file the data input/output means 10-*b* are integrated into a single block data and file data input/output means, and the system has four Ethernet ports 54-*a* for block data and four Ethernet ports 54-*b* for file data.

Instead of the Ethernet ports, other types of ports that enable input/output of Internet Protocol compliant packets may be used.

FIG. 8 shows one example of the basic, actual configuration of the storage system of logical structure shown in FIG. 5.

The storage system 1 includes four RAID modules 43, each having one Ethernet port 54-*a*, one file server 40 with four Ethernet ports 54-*b*, and a plurality of hard disk drives 44.

The file server 40 and the four RAID modules 43 are connected with four Ethernet lines 5.

The number of the components specified above should be considered only illustrative rather than restrictive. As an example, because of the physical size limitation of the storage system, the maximum number of ports that the storage system 1 is fixed to eight. However, the number of the Ethernet ports 54-*a* can be increased by increasing the number of the RAID modules 43.

If the number of the Ethernet ports 54-*a* is increased, the number of the Ethernet ports 54-*b* connected to the file server must be decreased accordingly so as to maintain the same total port number.

Logical volumes are allocated in the same manner as described in Embodiment 1.

How the functional components of the storage system writes and reads block data and file data is explained below.

When block data is to be written, the block data is input to the storage system through an Ethernet port 54-*a*.

Then, the block data and file data input/output means 11 processes for the block data according to the Internet Protocol, extracts SCSI protocol compliant packets from the Internet Protocol compliant packets, and extracts block data from the SCSI protocol compliant packets and converts its data format to the data format that is internally applied in the storage system 1.

Further processing is the same as described in Embodiment 1.

When block data is to be read, the block data and file data input/output means 11 processes the block data as according to the Internet Protocol, extracts is SCSI protocol compliant packets from the Internet Protocol compliant packets, and derives the address of block data so as to read the data accordingly.

The address of a logical volume 35-*a* from which to read the block data is obtained from the address of the block data.

Then, the data is read from the physical address on the drive specified by the address translation table within the logical volume management means 30. The block data and file data input/output means 11 converts the data format that is internally applied in the storage system 1 to the data format for the SCSI protocol, transforms the SCSI protocol compliant packets containing the read data into Internet Protocol compliant packets, and outputs the IP packets through an Ethernet port 54-*a*.

When file data is to be written, the file data is input to the storage system through an Ethernet port 54-*b*.

Then, the block data and file data input/output means 11 processes the file data according to the Internet Protocol and converts its data format to the data format for the file system 20.

Further processing is the same as described in Embodiment 1.

When file data is to be read, the file system performs the same processing as described in Embodiment 1 except that the file data input/output means 10-*b* rather than the block data and file data input/output means 11, carries out the output and related processing.

According to Embodiment 2, both functions of the disk array system 6 and the NAS 7, shown in FIG. 2, are made coexisting in a single storage system wherein the hard disk drives are shared to store block data and file data. Thus, the total capacity of the hard disk drives is used effectively. Accordingly, the system management is simplified. Consequently, the TCO of the storage system is reduced.

In Embodiment 2, similarly, logical volume allocation represented in FIG. 4 can be performed.

<Embodiment 3>

Figure 6:
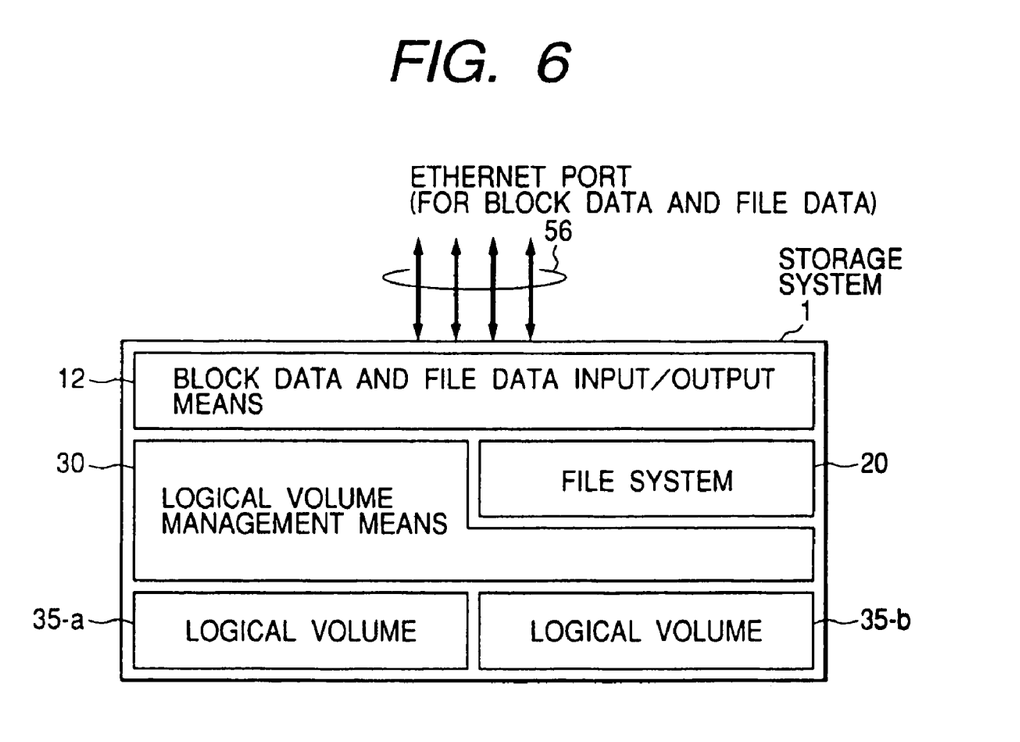
FIG. 6 is a diagram of a storage system of the present invention constructed in a further logical structure.
Figure 13:
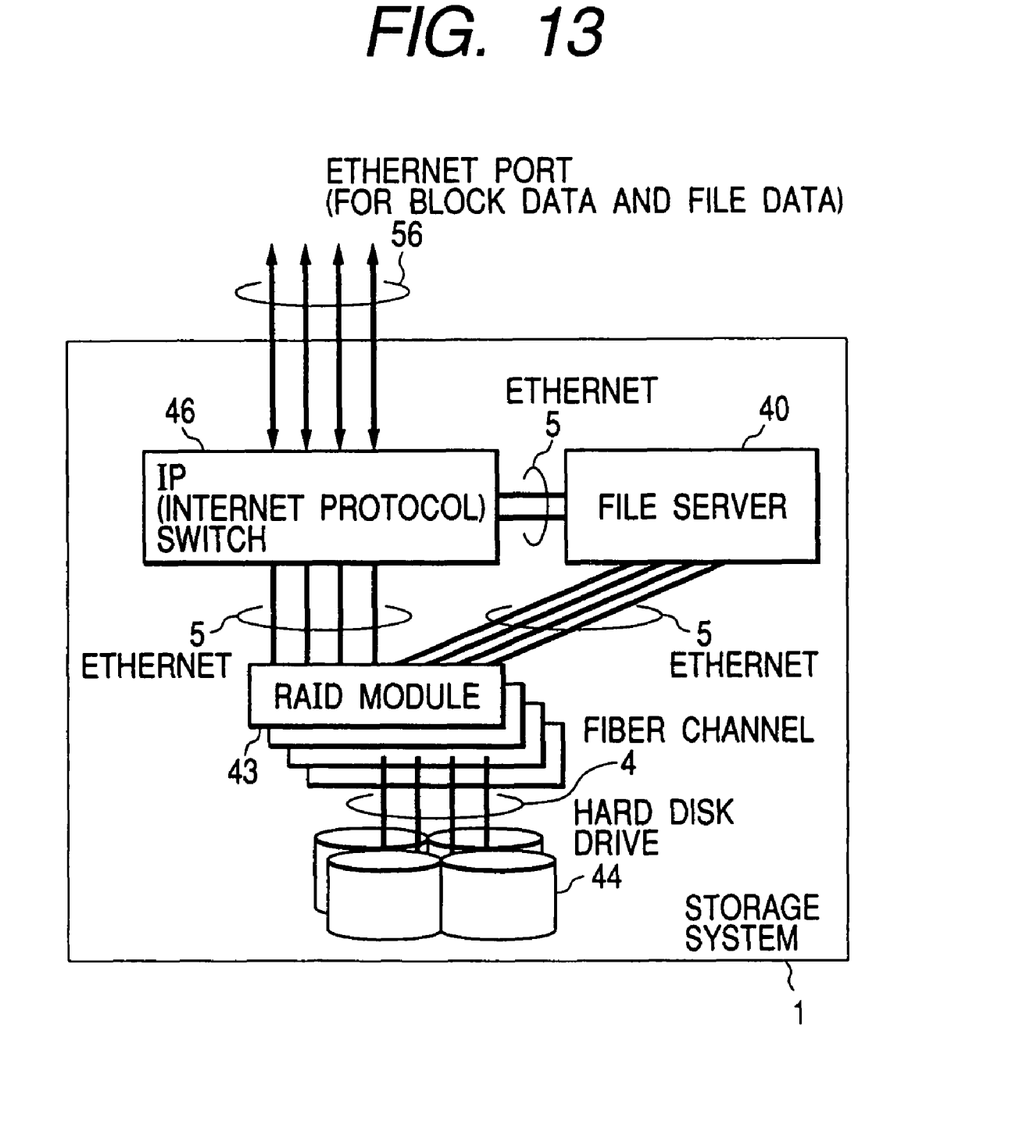
FIG. 13 is a diagram showing an actual configuration of the storage system shown in FIG. 6.

Another preferred Embodiment 3 of the present invention is depicted in FIGS. 6 and 13.

A storage system of Embodiment 3 also operates under the assumption that its storage areas are managed in units of logical volumes. Other embodiments are also subject to this assumption.

FIG. 6 shows the storage system 1 constructed in yet another logical structure.

The logical structure of the storage system 1 shown in FIG. 6 is the same as the one of Embodiment 2 shown in FIG. 5 except that the system has four Ethernet ports 56 which are common for block data and file data.

Instead of the Ethernet ports, other types of ports that enable input/output of Internet Protocol compliant packets may be used.

FIG. 13 shows one example of the basic, actual configuration of the storage system of logical structure shown in FIG. 6.

The storage system 1 includes one IP (Internet Protocol) switch 46 with four Ethernet ports 56 which are common for block data and file data, four RAID modules 43, one file server 40, and a plurality of hard disk drives 44.

The IP switch 46 and the four RAID modules 43 are connected with four Ethernet lines 5.

The file server 40 and the four RAID modules 43 are connected with four Ethernet lines 5.

The IP switch 46 and the file server 40 are connected with two Ethernet lines 5.

The IP switch 46 determine which of block data or file data has just been input through an Ethernet port 56 so as to deliver the block data to one of the RAID modules 43 or the file data to the file server 40. The file server 40 transforms file data to block data and delivers the block data to one of the RAID modules 43.

The number of the components specified above should be considered only illustrative rather than restrictive. The configuration and function of each RAID module 43 are the same as those of the RAID module 43 described in Embodiment 2.

The configuration of the file server 40 is the same as that shown in FIG. 12.

Logical volumes are allocated in the same manner as described in Embodiment 1.

How the functional components of the storage system writes and reads block data and file data is explained below.

In Embodiment 3, both block data and file data are input to the storage system through one of the common Ethernet ports 56.

The block data and file data input/output means processes the input data packets according to the Internet Protocol required and determines whether the packets contain block data or file data based upon the port number specified in the TCP packets encapsulated in the Internet Protocol compliant packets.

Further processing of either block data or file data is carried out in the same way as described in Embodiment 2.

According to Embodiment 3, both functions of the disk array system 6 and the NAS 7, shown in FIG. 2, are made coexisting in a single storage system wherein the hard disk drives are shared to store block data and file data. Thus, the total capacity of the hard disk drives is used effectively. Accordingly, the system management is simplified.

Consequently, the TCO of the storage system is reduced.

In Embodiment 3, similarly, logical volume allocation represented in FIG. 4 can be performed.

<Embodiment 4>

Figure 9:
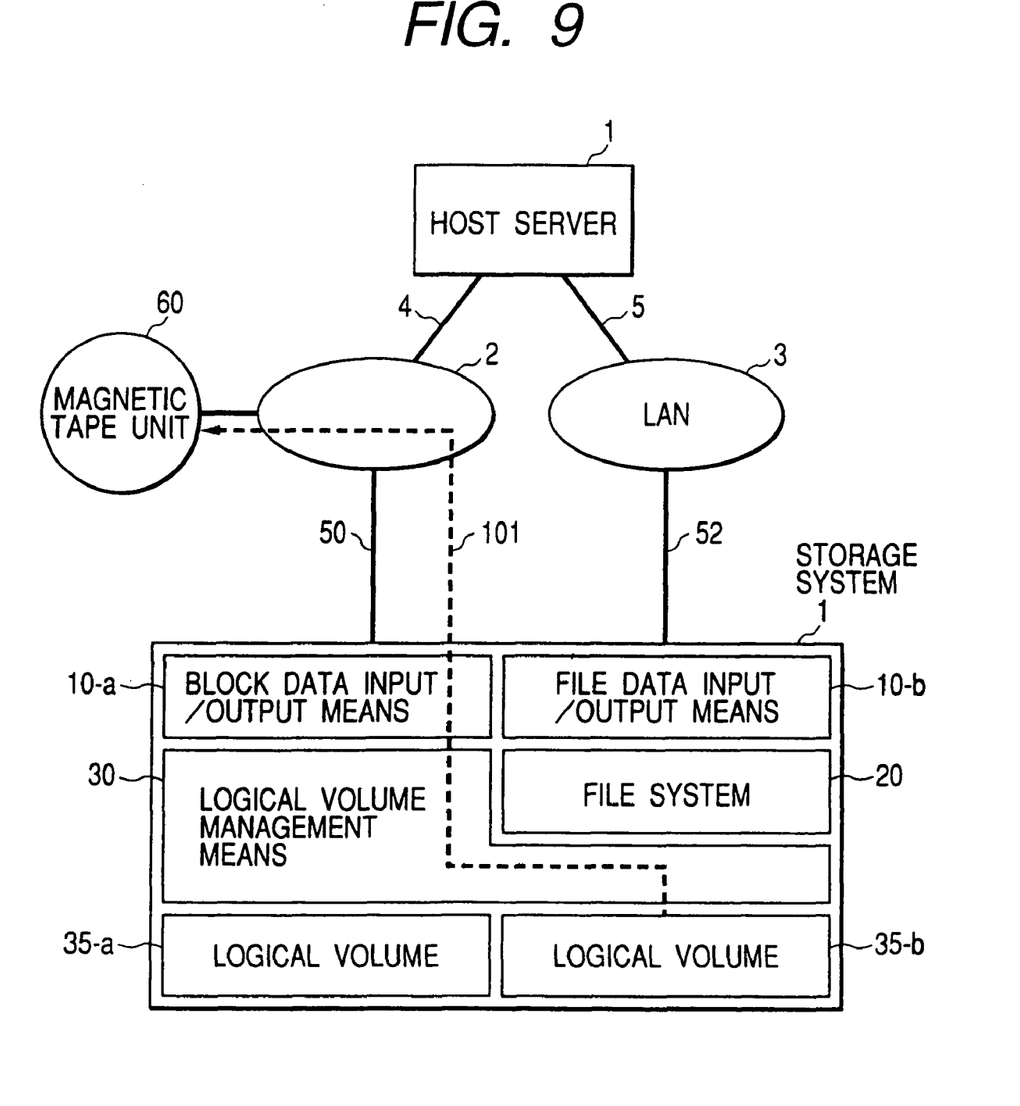
FIG. 9 is a diagram of a method for backing up of file-basis data from a storage system of the present invention to a magnetic tape unit.

FIG. 9 is provided to explain a method for high-speed backing up file data according to the present invention.

The storage system of Embodiment 4, also operates under the assumption that its storage areas are managed in units of logical volumes. Other embodiments are also subject to this assumption.

FIG. 9 illustrates a method for backing up file data stored in the storage system 1 in FIG. 1 to a magnetic tape unit 60 via a fiber channel based a Storage Area Network (FC-SAN) 2.

The magnetic tape unit 60 has an interface for fiber channel 4, and writes/reads block data.

The host server 1 has interfaces for both fiber channel 4 and Ethernet 5.

The host server 1 issues to the storage system 1 a backup request in which a directory under which the object file data exists is specified. The backup request is transmitted across the LAN 3 and received at an Ethernet port 52 of the storage system 1.

Upon receiving the backup request, the file system 20 derives form a logical volume to read backup data from the directory information for a to-be-backed-up file. The file system 20 informs the logical volume management means 30 of that logic volume from which backup data should be read and issues a request to back up the data as block data.

Upon receiving this request, the logical volume management means 30 reads the data from the physical address on the drive mapped to that logical volume as specified in the address translation table.

The read data is transferred to the block data input/output means 10-*a* where its data format that is internally applied in the storage system 1 is converted to the data format for fiber channel. After processed according to the protocol for fiber channels, the data is output through a fiber channel port 50 and transmitted across the fiber channel based the Storage Area Network (FC-SAN) 2 to the magnetic tape unit 60 where the data is recorded.

The feature of Embodiment 4 is that the file data is backed up after passing through the data path 101 marked in FIG. 9 without any intervention of the file system 20 as in the prior art.

Because magnetic tape units generally read and write block data only, when file data is backed up, the intervention of a server with a file system is required to transform file data into block data so as to send the block data to a magnetic tape unit for backing up.

In particular, in FIG. 9, file data is backed up in such a manner that the host server receives the to-be-backed-up file data read from the storage system 1 through the LAN 3, transforms the file data to block data, and transmits the block data across the FC-SAN 60 to the magnetic tape unit 60 where the data is backed up.

According to Embodiment 4, file data is directly backed up to the magnetic tape unit without the intervention of the server such that high-speed backing up of file data is performed.

Even if the magnetic tape unit has a file system so as to back up file data, the file data is still backed up to the magnetic tape unit without the intervention of the file system, according to Embodiment 4. Thus, the processing overhead of the file system is reduced, and high-speed backing up of file data is performed.

The invention in Embodiment 4 can also be carried out by the storage system 1 configured as in Embodiments 2 and 3 and the same effect is obtained as described.

<Embodiment 5>

Figure 10:
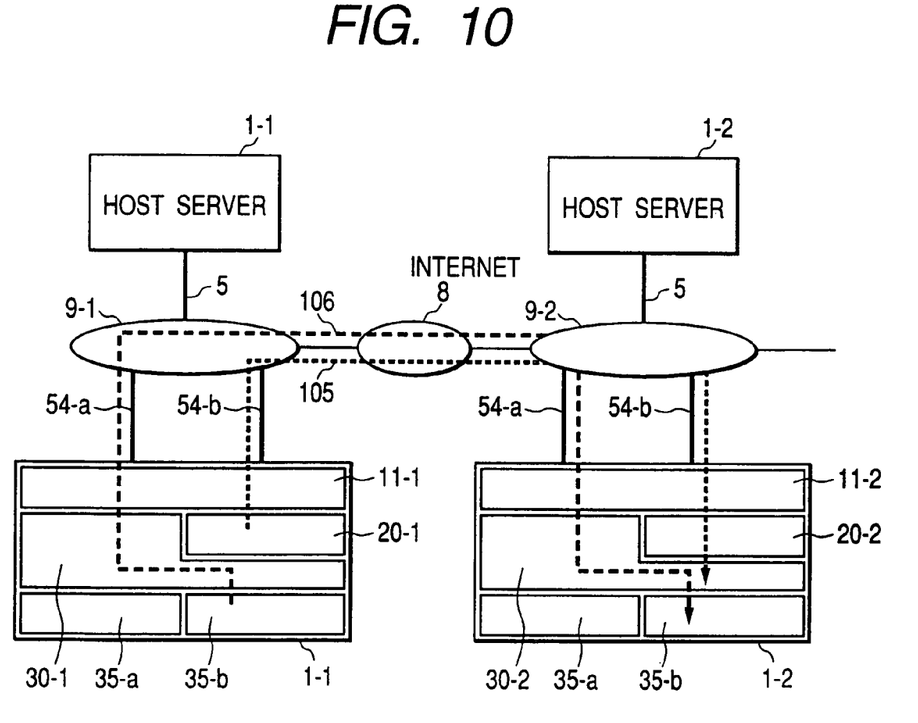
FIG. 10 is a diagram of a method for remotely copying file-basis data between storage systems of the present invention.

FIG. 10 is provided to explain a method for high-speed remotely copying file data according to the present invention.

The storage system of Embodiment 5 also operates under the assumption that its storage areas are managed in units of logical volumes. Other embodiments are also subject to this assumption.

FIG. 10 represents a method for remotely copying file data between two units of the storage system 1 in FIG. 5 (Embodiment 2).

Remote copying is a data duplicating technique by copying the data stored in one disk array system at one site to another disk array system at a geographically distant site.

The remote copying technique enables the following. If the disk array system at one site fails due to an accident or any natural disaster, the duplicated data in the disk array system at the other site can be used to continue the operation with the same data in the failed system. The data and system availability is ensured.

Refer to FIG. 10. Storage systems 1-1 and 1-2 are the same as the storage system shown in FIG. 5 (Embodiment 2).

The storage systems 1-1 and 1-2 are located in respective data centers that are geographically distant from each other. One storage system 1-1 is connected to an Ethernet-based SAN 9-1, and the other storage system 1-2 is connected to another Ethernet-based SAN 9-2.

The Ethernet-based SANs 9-1 and 9-2 are connected by the Internet 8.

Embodiment 5 is based on the conventional remote copying technique, and the relevant control method between the storage systems 1-1 and 1-2 is generally the same as in the conventional one. However, the following explanation of Embodiment 5 focuses on its essential parts of processing 105 wherein novelty lies and a data path 106 formed within and between the storage systems during remote copying.

File data is remotely copied from the storage system 1-1 to the storage system 1-2 in the procedure is described below.

The host server 1-1 issues a request for remote copying in which a directory under which the to-be-remotely-copied file data exists is specified to the storage system 1-1. The storage system 1-1 receives the request at its Ethernet port 54-*b* for file data.

Upon receiving the request, the file system 20-1 derives a logical volume to be remotely copied from the directory information. The file system 20-1 informs the file system 20-2 of the storage system 1-2 that the remote copy data in the object logical volume is transmitted from an Ethernet port 54-*a* for block data (without the intervention of the file system). This information is transmitted from an Ethernet port 54-*b* of the storage system 1-1 to an Ethernet port 54-*b* of the destination storage system 1-2 by means of IP (Internet Protocol) communication (as indicated by an arrow 105 in FIG. 10).

When the storage system 1-2 receives the above information, its file system 20-2 informs the logical volume management means 30-2 that file data will be input through an Ethernet port 54-*a* for block data without the intervention of the file system and which logical volume to process. At the same time, the file system 20-2 acknowledges the receipt of that information from the file system 20-1 by returning an acknowledgment (ACK) message to the file system 20-1.

Upon receiving the ACK message, the file system 20-1 informs the logical volume management means 30-1 of the volume to be remotely copied.

The above request for remote copying is request for copying all file data in the logic volume from the storage system 1-1 to the storage system 1-2. In addition, if the file data in the logic volume existing in the storage system 1-1 has been updated after being copied, the request includes requesting the storage system 1-2 to update the updated file data. These two cases are explained below.

The logical volume management means 30-1 reads the to-be-remotely-copied logic volume from the hard disk drive, and transfers the read data into block data to the file data input/output means 11-1. The block data and file data input/output means 11-1 converts its data format that is internally applied in the storage system 1 to the data format for the SCSI protocol, transforms the SCSI protocol compliant packets containing the volume data into Internet Protocol compliant packets, and transmits the IP packets from an Ethernet port 54-*a* across the Ethernet-based SANs 9 to the storage system 1-2.

Upon receiving the remote copy data, the logical volume management means 30-2 identifies the logical volume whose remote copy of file data it received by the logical volume address transmitted with the data, and writes the copy data into the logic volume (as indicated by an arrow 106 in FIG. 10).

If data existing within the copied volume in the storage system 1-1 is updated, the updated data is read from the hard disk drive and transferred into the block data to the file data input/output means 11-1. The block data and file data input/output means 11-1 converts its data format that is internally applied in the storage system 1 to the data format for the SCSI protocol, transforms the SCSI protocol compliant packets containing the read data into Internet Protocol compliant packets, and transmits the IP packets from an Ethernet port 54-*a* across the Ethernet-based SANs 9 to the storage system 1-2.

Upon receiving the remote copy data, the logical volume management means 30-2 identifies the logical volume whose remote copy of file data it received by the logical volume address transmitted with the data, and updates the corresponding data within the logic volume (as indicated by the arrow 106 in FIG. 10).

According to Embodiment 5, file data is remotely copied between the storage systems without the intervention of the file systems such that the processing overhead of the file systems is reduced, and high-speed remote copying of file data is performed.

The invention in Embodiment 5 can also be carried out with the storage systems 1 configured as in Embodiments 1 and 3 and the same effect is obtained as described.

According to the present invention, the total capacity of hard disk drives can be used effectively and the management thereof is simplified in environment where a storage system for storing block-basis data (ex., a disk array system) coexists with a storage system for storing file-basis data (ex., a NAS).

Furthermore, the invention provides storage systems for backing up and copying file-basis data at high speed.

The present invention may be embodied in other specific forms without departing from the spirit or essential characteristics thereof The described embodiments are to be considered in all respects only as illustrated and not restrictive. Variations and changes may be made by one skilled in the art without departing from the spirit of the present invention. Accordingly, it is expressly intended that all such variations or changes which fall within the spirit and scope of the present invention as defined in the claims, be embraced thereby.

What is claimed:

1. A storage system comprising:
   a plurality of physical input/output ports;
   a control unit coupled to the plurality of physical input/output ports; and
   a plurality of disk drives coupled to the control unit,
   wherein a first port of the plurality of physical input/output ports is accessible by both a block I/O request via an IP network and by a file I/O request via the IP network, and
   wherein the plurality of disk drives are configured into a first logical volume assigned to store data related to the block I/O request and a second logical volume assigned to store data related to the file I/O request based upon information contained in the block I/O request or the file I/O request.

2. A storage system according to claim 1,
   wherein the storage system includes means for partitioning the first and second logical volumes, the first logical volume being used for storing data in a block format and the second logical volume being used for storing data in a file format.

3. A storage system according to claim 2,
   wherein said means for partitioning re-designates a particular storage area of one the first and second logical volumes into another one of the first and second logical volumes.

4. A storage system according to claim 1,
   wherein said storage system backs up file data stored in the second logical volume, transforms the file data into a block data format and outputs the transformed file data to an external storage system that stores the transformed file data in the block data format via a second port being accessible by a block I/O request.

5. A storage system according to claim 1,
   wherein when the file data is copied between said storage system and an external storage system, information concerning a logical volume to be copied is notified between a file system of each of the storage systems, and the file data stored in said storage system is copied via a second port being accessible by a block I/O request.

6. A storage system according to claim 1,
   wherein the plurality of disk drives are configured into the first logical volume that is assigned to store data related to the block I/O request, the second logical volume that is assigned to store data related to the file I/O request and a third logical volume that is different from the first logical volume and the second logical volume.

7. A storage system according to claim 6,
   wherein the storage system includes means for partitioning the first, second and third logical volumes into the first logical volume for storing data in a block format and the second logical volume for storing data in the file format and the third logical volume.

8. A storage system according to claim 7,
   wherein said means for partitioning re-designates a particular storage area of the third logical volume into the first or second logical volumes.

9. A storage system according to claim 6,
   wherein said storage system backs up file data stored in the second logical volume, transforms the file data into a block data format and outputs the transformed file data to an external storage system that stores the transformed file data in the block data format via a second port being accessible by a block I/O request.

10. A storage system according to claim 6,
    wherein when the file data is copied between said storage system and an external storage system, information concerning the logical volume to be copied is notified between a file system of each of the storage systems, and the file data stored in said storage system is copied via a second port being accessible by a block I/O request.

11. A storage system according to claim 6,
    wherein a total number of the physical input/output ports is fixed and at least one of which is designed for inputting/outputting block data or file data.

12. A storage system to be coupled to an IP network, said storage system comprising:
    a plurality of physical input/output ports to be coupled to the IP network;
    a control unit coupled to the physical input/output ports; and
    a plurality of disk drives coupled to the control unit,
    wherein a first port of the physical input/output ports is accessible by both a block I/O request via the IP network and by a file I/O request via the IP network,
    wherein the physical input/output ports include a second port being accessible by a block I/O request and a third port being accessible by a file I/O request, and
    wherein the plurality of disk drives are configured into a first logical volume assigned to store data related to the block I/O request and a second logical volume assigned to store data related to the file I/O request based upon information contained in the block I/O request or the file I/O request.

13. A storage system according to claim 12,
    wherein the storage system includes means for partitioning the first and second logical volumes, the first logical volume being used for storing data in a block format and the second logical volume being used for storing data in a file format.

14. A storage system according to claim 13,
    wherein said means for partitioning re-designates a particular storage area of one of the first and second logical volumes into another one of the first and second logical volumes.

15. A storage system according to claim 12,
    wherein said storage system backs up file data stored in the second logical volume, transforms the file data into the block data format and outputs the transformed file data to an external storage device that stores the transformed file data in the block data format via the second port.

16. A storage system according to claim 12,
    wherein when the file data is copied between said storage system and an external storage system, information concerning the logical volume to be copied is notified between a file system of each of the storage systems, and the file data stored in said storage system is copied via the second port.

17. A storage system according to claim 12,
    wherein the plurality of disk drives are configured into the first logical volume which is assigned to store data related to the block I/O request, the second logical volume which is assigned to store data related to the file I/O request and a third logical volume that is different from the first logical volume and the second logical volume.

18. A storage system according to claim 17, wherein the storage system includes means for partitioning the first, second and third logical volumes into the first logical volume for storing data in a block format and the second logical volume for storing data in a file format and the third logical volume.

19. A storage system according to claim 17, wherein said storage system backs up file data stored in the second storage area, transforms the file data into the block data format and outputs the transformed file data to an external storage device that stores the transformed file data in the block data format via the second port.

20. A storage system according to claim 19, wherein said means for partitioning re-designates a particular storage area of third logical volume into the first or second logical volumes.

21. A storage system according to claim 17, wherein when the file data is copied between said storage system and an external storage system, information concerning the storage area to be copied is notified between a file system of each of the storage systems, and the file data stored in said storage system is copied via the second port.

* * * * *